F. MEINBERG.
Corset-Spring.
No. 214,512.  Patented April 22, 1879.
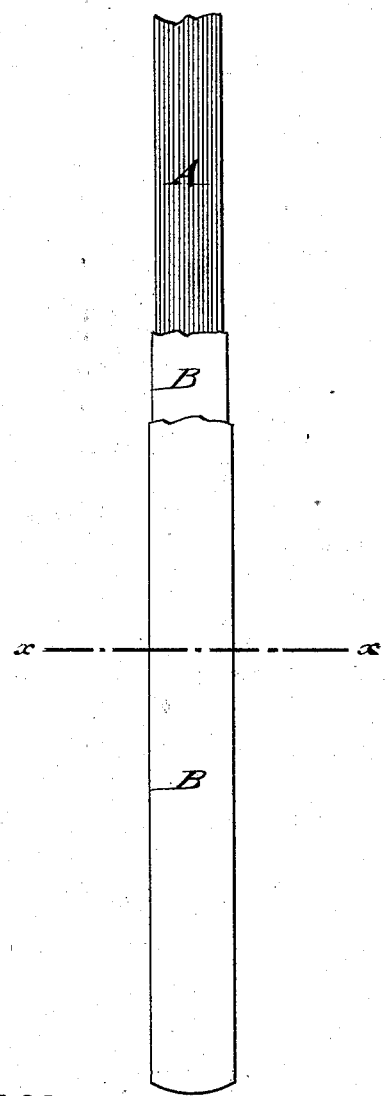

UNITED STATES PATENT OFFICE.

FRANZ MEINBERG, OF NEW YORK, N. Y.

IMPROVEMENT IN CORSET-SPRINGS.

Specification forming part of Letters Patent No. 214,512, dated April 22, 1879; application filed March 5, 1879.

*To all whom it may concern:*

Be it known that I, FRANZ MEINBERG, of the city, county, and State of New York, have invented certain new and useful Improvements in Covering Corset and other Springs, of which the following is a specification.

In the accompanying drawings, Figure 1 represents a side view of a corset or other spring with my improved covering; and Fig. 2 is a horizontal section of the same on line $x$ $x$, Fig. 1.

Similar letters of reference indicate corresponding parts.

The object of this invention is to furnish for corset, truss, and other springs a reliable anti-corrosive covering, by which the rusting and deterioration of the metal, as well as the soiling of the corsets, trusses, &c., by rust, are entirely prevented, and a greater durability to the springs obtained.

The invention consists of corset, truss, or other springs, which are covered by one or more layers of animals' gullets or guts, that are applied to the metal in moist state by soluble glass and suitable pressure.

Referring to the drawings, A represents a spring of steel or other metal as employed for corsets, trusses, and other articles. This spring A is protected by one or more layers, B, of prepared animal guts or gullets. These are thoroughly cleaned and dried, placed in warm water, so as to render them soft and pliable, and then thoroughly soaked on the soft or flesh side with soluble glass, they being then wrapped around the spring and the air expelled from between the covering and spring by suitable pressure. After the first layer has thoroughly dried, a second, third, &c., layer may be laid on in the same manner as described.

The hard exterior surface of the covering gut or gullet resists in a perfectly reliable manner the corrosive influence of the perspiration, but may be further covered by a coating of varnish mixed with paint, as described.

The gut or gullet covering adheres to the spring, and has sufficient elasticity to follow every motion of the spring without giving access to air, moisture, or other corrosive agencies. The springs are thus protected in a superior manner against oxidation, and are consequently more durable, and dispense with the disagreeable soiling of the covering fabric of the corsets, &c., by the rusting of the metal.

Having thus described my invention, I claim as new and desire to secure by Letters Patent—

1. As a new article of manufacture, a corset, truss, or other metal spring covered by one or more layers of animal gut or gullet, substantially as set forth.

2. The method herein described of covering corset or other springs, consisting in softening animal guts or gullets in warm water, rubbing the soft or flesh side with soluble glass, wrapping them around the springs and expelling the air by pressure, substantially as described.

3. As a new article of manufacture, a corset, truss, or other spring covered by one or more layers of guts or gullets, the outer layer having a varnish or paint coating, substantially as set forth.

In testimony that I claim the foregoing as my invention I have signed my name, in presence of two witnesses, this 3d day of February, 1879.

FRANZ MEINBERG.

Witnesses:
  PAUL GOEPEL,
  ADOLF DENGLER.